ent Office 2,918,383
Patented Dec. 22, 1959

2,918,383
CERAMIC FRIT COMPOSITION

James H. Strimple, Milltown, N.J., assignor to National Lead Company, New York, N.Y., a corporation of New Jersey No Drawing. Application March 21, 1957
Serial No. 647,484
3 Claims. (Cl. 106—48)

This invention relates in general to frit compositions. More specifically, this invention relates to the preparation of frit compositions from which colored porcelain enamels may be produced.

Many types of frit compositions have been produced which form colored porcelain enamels when sprayed and fired on metal surfaces. These frit compositions vary considerably in chemical composition and most any type and color of porcelain enamel has been produced by a variety of methods. This invention is primarily concerned with frit compositions which are opacified with titanium dioxide and which form pink porcelain enamels upon firing.

Colored porcelain enamels usually are produced by adding, as a mill addition, a color stain as the coloring agent. However, in forming a pink enamel color stains added as mill additions are not suitable when a titania opacified frit composition is employed. Although combinations of chromium and tin compounds have been used as stains in forming pink enamels, these stains are not suitable when used with titania opacified frit compositions.

Another type of coloring agent employed for producing colored porcelain enamels are those which are added as one of the ingredients in the frit composition itself. These coloring agents are present in the frit composition in varying amounts to produce the desired color effect in the porcelain enamels formed upon firing. In titania opacified frit compositions, small amounts of gold have been added as an ingredient to produce a pink porcelain enamel. Two disadvantages, however, are encountered with this method; gold is an expensive ingredient, and the pink color obtained in the porcelain enamel is variable. This method is undesirable to use, therefore, since the pink color will vary from batch to batch, thus making it difficult to obtain pink colors which will match. It is desirable, therefore, to develop a titania opacified frit composition which, when fired, produces reproducible pink porcelain enamels.

An object of this invention, therefore, is to produce a new and novel titania opacified frit composition which produces a pink porcelain enamel upon firing. A further object is to produce an economical frit composition which, when fired, produces a reproducible pink enamel. These and other objects will become apparent from the following more complete description of the instant invention.

Broadly, this invention contemplates a titania opacified frit composition, capable of forming a pink porcelain enamel upon firing, said composition consisting essentially of the following ingredients:

| | Mole percent |
|---|---|
| $SiO_2$ | 40–50 |
| $Na_2O$ | 5–7 |
| $K_2O$ | 5–7 |
| $Li_2O$ | 0–2 |
| $B_2O_3$ | 15–19 |
| $P_2O_5$ | 0–3 |
| $TiO_2$ | 8–15 |
| $ZnO$ | 7–11 |
| $F_2$ | 0–7 |
| $CdS$ | 0.1–2.0 |
| $Se$ | 0.05–1.0 |

The frit composition of the instant invention is prepared by any standard method. For example, the raw materials are mixed thoroughly together and the mixture is melted. The molten mixture is then poured into water to form the frit.

The raw materials used are all standard ceramic grade materials employed in making various frit compositions; however, it is necessary to add the raw materials in quantities to produce the necessary critical amounts in the frit produced. Each ingredient must be present in the amounts specified above or undesirable results will be obtained.

The combination of cadmium sulfide and selenium is used as the coloring agent in the frit composition to produce the desirable pink color in the porcelain enamel. This coloring agent may be added to the frit batch as cadmium sulfide and selenium metal or as a cadmium sulfoselenide compound. This combination should be added in amount to produce in the frit composition amounts from 0.1 to 2.0% for the cadmium sulfide and from 0.05% to 1.0% for the selenium.

Although various tones and shades of pink ranging from peach to coral are obtained by varying the amounts of the ingredients in the frit composition within the ranges specified above, all of these products are pleasing to the eye and are reproducible from batch to batch.

The mixture of raw materials used in preparing this type of frit composition melt in the temperature range of 1250° C. to 1350° C. The frit composition formed from the mixture is then ground and mixed with standard mill additions to form a slip and the slip is sprayed onto a metal surface in the usual manner. The coated surface is then fired to form the pink porcelain enamel.

In order to more fully illustrate the instant invention, the following examples are presented.

EXAMPLE I

A frit composition was prepared by melting together for about 1 hour at about 1350° C., a mixture of the following ingredients:

| | Parts by wt. |
|---|---|
| Potassium fluosilicate | 3.3 |
| Monobasic sodium phosphate | 32.1 |
| Borax (anhydrous) | 24.3 |
| Orthoboric acid | 67.2 |
| Potash | 30.3 |
| Zinc carbonate | 45.3 |
| Titanium dioxide | 34.5 |
| Potter's flint | 123.9 |
| Cadmium sulfide | 1.86 |
| Selenium metal powder | 0.51 |

Upon obtaining complete intersolution of the ingredients, the melt was quenched in water to form a frit having the following composition:

| Component | Mole Percent | Weight Percent |
|---|---|---|
| $SiO_2$ | 48.25 | 55.8 |
| $Na_2O$ | 5.5 | 6.1 |
| $K_2O$ | 5.4 | 4.0 |
| $B_2O_3$ | 18.3 | 14.8 |
| $P_2O_5$ | 2.7 | 1.3 |
| $TiO_2$ | 10.0 | 8.7 |
| $ZnO$ | 8.4 | 7.2 |
| $F_2$ | 1.0 | 1.8 |
| $CdS$ | 0.3 | 0.15 |
| $Se$ | 0.15 | 0.15 |

One hundred parts of this quenched frit were ball milled for 16 hours with 4 parts of clay, 0.125 part $NaNO_2$, 0.3 part $K_2CO_3$, and 40 parts demineralized water. The milled frit was then strained through a 100 mesh screen to remove any coarse particles. The strained slip was well dispersed and of sprayable consistency.

The milled slip was then sprayed onto four cobalt ground-coated steel panels at a dry application weight of about 30 grams per square foot. They were air dried followed by drying at 110° C. for 15 minutes, and then fired under oxidizing conditions (air atmosphere) at 790° C., 815° C., and 840° C. for three minutes. The resulting enamels were smooth, glossy, continuous and had a uniform and pleasing pink color. The resulting enamels also exhibited excellent color stability over the aforementioned firing range.

EXAMPLES II–IX

A series of frit compositions were prepared according to substantially the same procedure as that described in Example I in which the frit compositions were varied from one another. All, however, falling within the ranges specified above. The raw materials added and the frit compositions are recorded in Tables 1, 2 and 3. Porcelain enamels were formed from all of these frit compositions using the procedure described in Example I and the resulting porcelain enamels were all smooth, continuous, durable enamels having uniform pink colors. The shade and tone of the color obtained varied somewhat with the combination and amounts of agents employed.

EXAMPLE X

A frit composition was made which was substantially identical to the frit composition produced in Example I and upon firing the color of the porcelain enamel matched the color of the enamel produced in Example I.

Table 1

| Components | Parts by Weight | | | | | | | |
|---|---|---|---|---|---|---|---|---|
| | Example II | Example III | Example IV | Example V | Example VI | Example VII | Example VIII | Example IX |
| Potassium Fluosilicate | 3.3 | 3.3 | 3.6 | 3.6 | 2.7 | | | 22.5 |
| Monobasic Sodium Phosphate | 31.5 | 31.5 | | 30.3 | 30.9 | 30.9 | 31.5 | 32.1 |
| Borax (Anhydrous) | 24.3 | 26.4 | 48.8 | 24.6 | 24.3 | 25.5 | 25.5 | 24.3 |
| Orthoboric Acid | 66.6 | 67.2 | 39.0 | 63.6 | 57.0 | 63.3 | 68.1 | 52.2 |
| Potash | 30.3 | 30.3 | 30.9 | 28.5 | 29.4 | 31.2 | 32.1 | 18.0 |
| Zinc Carbonate | 44.7 | 44.7 | 45.9 | 51.6 | 43.5 | 44.1 | 44.7 | 45.3 |
| Titanium Dioxide | 34.2 | 34.2 | 35.1 | 33.3 | 50.1 | 33.6 | 34.2 | 34.2 |
| Potter's Flint | 121.2 | 110.4 | 123.9 | 113.4 | 107.5 | 118.2 | 125.4 | 102.0 |
| Lithium Carbonate | | 6.6 | | | | | | |
| Cadmium Sulfide | 4.95 | 6.0 | 12.3 | 11.4 | 11.7 | 12.21 | 1.83 | 12.0 |
| Selenium Metal Powder | 1.29 | 1.8 | 3.6 | 3.3 | 3.3 | 3.3 | 0.51 | 3.0 |

Table 2

| | Mole Percent | | | | | | | |
|---|---|---|---|---|---|---|---|---|
| | Example II | Example III | Example IV | Example V | Example VI | Example VII | Example VIII | Example IX |
| $SiO_2$ | 47.5 | 45.2 | 48.4 | 46.0 | 43.2 | 46.6 | 48.75 | 42.7 |
| $Na_2O$ | 5.5 | 5.5 | 5.5 | 5.5 | 5.5 | 5.5 | 5.5 | 5.5 |
| $K_2O$ | 5.4 | 5.4 | 5.4 | 5.4 | 5.4 | 5.4 | 5.4 | 5.4 |
| $B_2O_3$ | 18.3 | 18.3 | 18.3 | 16.4 | 15.8 | 18.3 | 18.8 | 15.3 |
| $P_2O_5$ | 2.7 | 2.7 | | 2.7 | 2.7 | 2.7 | 2.7 | 2.7 |
| $TiO_2$ | 10.0 | 10.0 | 10.0 | 10.0 | 15.0 | 10.0 | 10.0 | 10.0 |
| ZnO | 8.4 | 8.4 | 8.4 | 10.0 | 8.4 | 8.4 | 8.4 | 8.4 |
| $F_2$ | 1.0 | 1.0 | 1.0 | 1.0 | 1.0 | | | 7.0 |
| CdS | 0.8 | 1.0 | 2.0 | 2.0 | 2.0 | 2.0 | 0.3 | 2.0 |
| Se | 0.4 | 0.5 | 1.0 | 1.0 | 1.0 | 1.0 | 0.15 | 1.0 |
| $Li_2O$ | | 2.0 | | | | | | |

Table 3

| | Weight Percent | | | | | | | |
|---|---|---|---|---|---|---|---|---|
| | Example II | Example III | Example IV | Example V | Example VI | Example VII | Example VIII | Example IX |
| $SiO_2$ | 53.3 | 49.7 | 53.8 | 52.1 | 49.5 | 53.3 | 55.0 | 46.4 |
| $Na_2O$ | 6.0 | 5.9 | 6.0 | 6.1 | 6.1 | 6.1 | 6.0 | 5.8 |
| $K_2O$ | 3.8 | 3.8 | 3.8 | 3.9 | 3.9 | 3.9 | 3.9 | 3.7 |
| $B_2O_3$ | 17.7 | 17.4 | 17.6 | 16.1 | 15.6 | 18.0 | 18.2 | 14.4 |
| $P_2O_5$ | 1.3 | 1.2 | | 1.3 | 1.3 | 1.3 | 1.3 | 1.2 |
| $TiO_2$ | 8.4 | 8.2 | 8.4 | 8.5 | 12.9 | 8.6 | 8.4 | 8.2 |
| ZnO | 6.9 | 6.8 | 6.9 | 8.4 | 7.1 | 7.1 | 7.0 | 6.7 |
| $F_2$ | 1.8 | 1.7 | 1.7 | 1.8 | 1.8 | | | 11.8 |
| CdS | 0.3 | 0.5 | 0.9 | 0.9 | 0.9 | 0.9 | 0.1 | 0.9 |
| Se | 0.5 | 0.4 | 0.9 | 0.9 | 0.9 | 0.8 | 0.1 | 0.9 |
| $Li_2O$ | | 4.4 | | | | | | |
| | 100.0 | 100.0 | 100.0 | 100.0 | 100.0 | 100.0 | 100.0 | 100.0 |
| Color of Enamel | Pink | Pink | Peach | Peach | Pink | Coral | Pink | Coral |

From the above description and by the examples presented, it has clearly been shown that reproducible and uniformly pink porcelain enamels have been produced from a titania opacified frit composition.

The cadmium sulfide and selenium used as the coloring ingredients in the enamel frit composition are employed in sufficiently small amounts to make it possible to produce pink enamels more economically than by using gold as the coloring agent.

Furthermore, the use of the frit composition of the instant invention is more desirable than using a frit composition containing gold since reproducible colors are obtained using the frit compositions of the instant invention.

While this invention has been described and illustrated by the examples shown, it is not intended to be strictly limited thereto, and other variations and modifications may be employed within the scope of the following claims.

I claim:

1. A frit composition capable of forming a reproducible pink porcelain enamel, said composition consisting essentially of:

| | Mole percent |
|---|---|
| $SiO_2$ | 40–50 |
| $Na_2O$ | 5–7 |
| $K_2O$ | 5–7 |
| $Li_2O$ | 0–2 |
| $B_2O_3$ | 15–19 |
| $P_2O_5$ | 0–3 |
| $TiO_2$ | 8–15 |
| $ZnO$ | 7–11 |
| $F_2$ | 0–7 |
| $CdS$ | 0.1–2.0 |
| $Se$ | 0.05–1.0 |

2. Composition according to claim 1 in which the cadmium sulfide and the selenium present are added as cadmium sulfoselenide.

3. Composition according to claim 1 in which the selenium present is added as selenium metal.

References Cited in the file of this patent

UNITED STATES PATENTS

| 2,414,633 | Bryant | Jan. 21, 1947 |
| 2,514,855 | Goetchins | Jan. 11, 1950 |
| 2,706,692 | Chester | Apr. 19, 1955 |
| 2,753,271 | Treptow | July 3, 1956 |

OTHER REFERENCES

J. H. Koenig et al.: Literature Abstracts of Ceramic Glazes (1951), pages 54, 59, 207, 265, 334.

W. W. Coffeen: Enamel Bibliography and Abstracts (1956), columns 112d, 114j and 98c.